United States Patent [19]
Rao et al.

[11] Patent Number: 5,392,692
[45] Date of Patent: Feb. 28, 1995

[54] ANTIBLOW-BY PISTON AND SEAL CONSTRUCTION FOR HIGH TEMPERATURE APPLICATIONS

[75] Inventors: V. Durga N. Rao, Bloomfield Township, Oakland County; Daniel M. Kabat, Oxford, both of Mich.

[73] Assignee: Ford Motor Company, Dearborn, Mich.

[21] Appl. No.: 213,336

[22] Filed: Mar. 14, 1994

[51] Int. Cl.⁶ .............................................. F16J 9/00
[52] U.S. Cl. .................................... 92/246; 92/223; 92/261; 277/168; 277/216; 277/DIG. 6
[58] Field of Search ................... 92/208, 223, 246; 123/193.6; 277/168, 169, 216, 217, 223, 224, DIG. 6

[56] References Cited
U.S. PATENT DOCUMENTS

| | | |
|---|---|---|
| 2,410,405 | 11/1946 | Cornelius . |
| 2,519,683 | 8/1950 | Marien . |
| 2,575,214 | 11/1951 | Garland et al. . |
| 2,609,260 | 9/1952 | Marien . |
| 2,817,562 | 12/1957 | Fleming et al. . |
| 2,844,424 | 7/1958 | Goetze ........................... 277/168 |
| 2,862,736 | 12/1958 | Russell .......................... 277/169 |
| 3,012,831 | 12/1961 | Cheney et al. . |
| 3,095,204 | 6/1963 | Neely . |
| 3,917,290 | 11/1975 | Geffroy . |
| 3,938,814 | 2/1976 | Cromwell . |
| 3,942,808 | 3/1976 | Gross . |
| 4,612,260 | 9/1986 | Kumagai . |
| 4,735,128 | 4/1988 | Mahrus et al. . |
| 4,899,702 | 2/1990 | Sasaki et al. .................. 123/193.6 |
| 4,962,691 | 10/1990 | Kanao ............................ 123/193.6 |
| 5,072,653 | 12/1991 | Parsons ......................... 123/193.6 |
| 5,133,564 | 7/1992 | Chang . |
| 5,154,433 | 10/1992 | Naruse .......................... 277/235 A |
| 5,158,052 | 10/1992 | Yoshimura . |

FOREIGN PATENT DOCUMENTS

| | | | |
|---|---|---|---|
| 0200650 | 12/1982 | Japan ............................ 123/193.6 |
| 500307 | 2/1939 | United Kingdom ............ 92/246 |
| 719537 | 12/1954 | United Kingdom ............ 92/246 |

*Primary Examiner*—Thomas E. Denion
*Attorney, Agent, or Firm*—Joseph W. Malleck; Roger L. May

[57] ABSTRACT

A piston and ring assembly operative within a cylindrical bore wall to retain fluid to one side of the assembly, comprising a piston having at least one annular stepped groove in the side wall of the piston, the groove being stepped into uppermost and lowermost spaces with the uppermost space having the greatest depth; at least two split compression rings in the groove, effective to each substantially annularly engage the bore wall, the rings having mating surfaces superimposed one upon another and having their split ends out of superimposed alignment, and a solid lubricant that coats essentially all of the groove and constitutes the non-mating surfaces of the superimposed rings. Pressure of the retained fluid forces the rings together to act in unison and seal jointly against both the step and a side of the groove opposite the retained fluid. The solid film lubricant assists in eliminating freezing of the rings against the groove sides, increasing ring fatigue life, enhancing ring tension and reducing engine emissions.

12 Claims, 6 Drawing Sheets

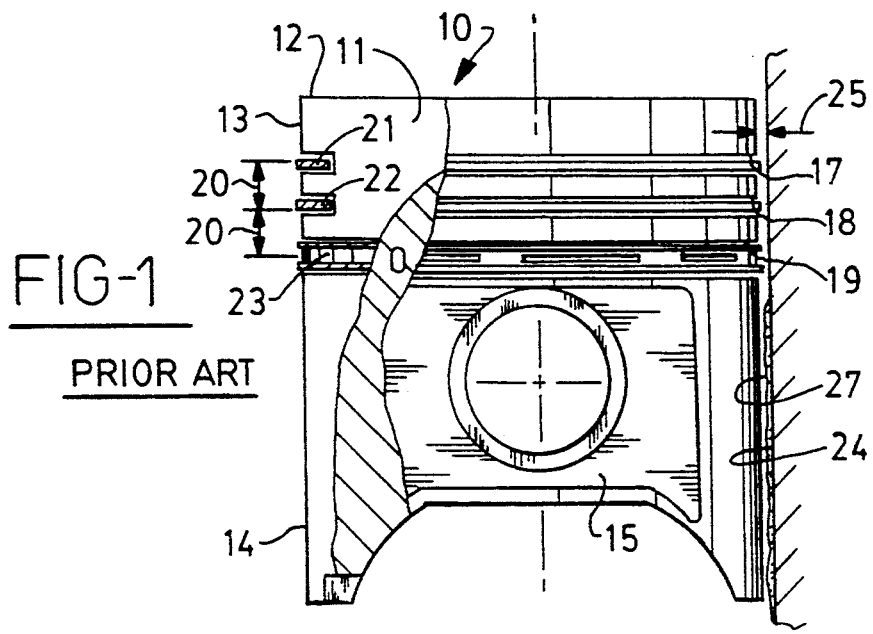
FIG-1 PRIOR ART
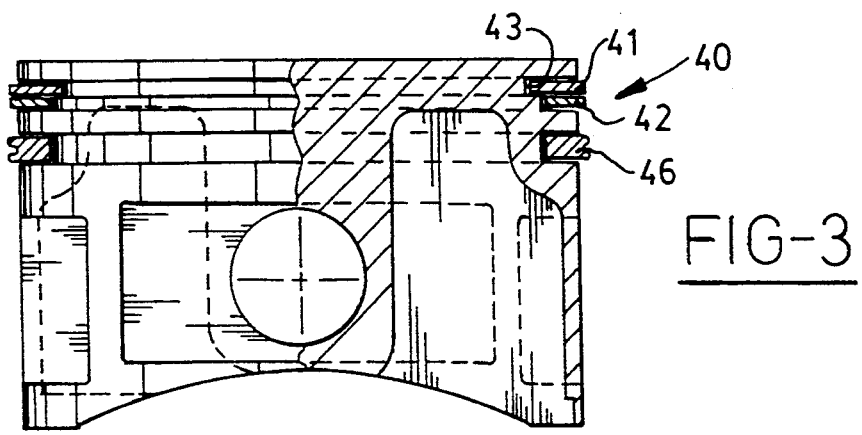
FIG-3
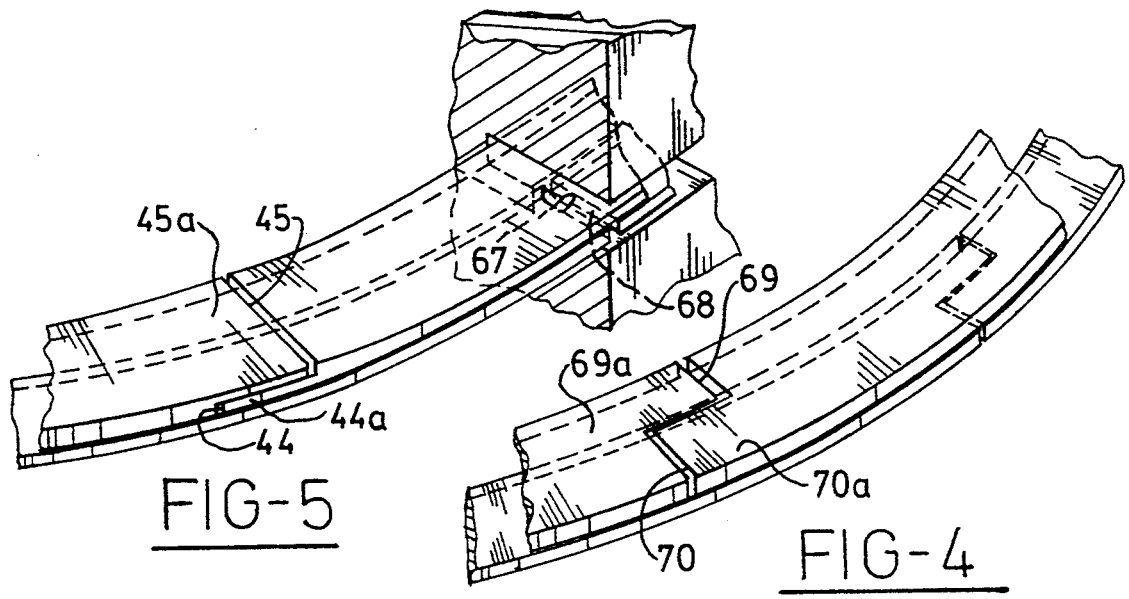
FIG-5
FIG-4

ANTIBLOW-BY PISTON AND SEAL CONSTRUCTION FOR HIGH TEMPERATURE APPLICATIONS

BACKGROUND OF THE INVENTION

1. Technical Field

This invention relates to the design of piston and cylinder assemblies and more particularly to improvements that reduce the crevice volume of the piston cylinder assembly and enhance sealing contact of the piston rings while reducing friction.

2. Discussion of the Prior Art

This invention addresses one or more of five problems characteristic of current designs for high-temperature piston-cylinder assemblies (i.e., internal combustion engine pistons with piston rings): (i) excessive crevice volume, (ii) excessive blow-by of fluids, (iii) premature ring fatigue failure, (iv) induced oil combustion, and (v) high cost of machining ring grooves.

Crevice volume (which means the space between the piston and cylinder bore wall, including the groove spaces up to generally the point of sealing of the bottom compression ring) increases with clearance between the piston crown and bore wall, and increases with groove size. Large crevice volumes are inherent in current piston cylinder designs for commercial automotive internal combustion engines and thus allow for the presence of some unburned fuel and thereby the tendency to increase emissions. Moreover, greater fuel is injected into the combustion chamber at cold start to initiate and sustain combustion; resulting unburned fuel is not readily converted by the catalyst during cold start. Consider also that the design of the piston relative to the cylinder bore is set for the smallest clearance at cold start conditions; thermal expansion of the piston material relative to the bore material, (i.e., aluminum piston to a cast iron bore) will cause the crevice volume to increase at higher temperatures.

It would be ideal to have a piston that reciprocates within a cylinder bore with no clearance between the piston (crown or skirt) and the bore wall and with little or no friction under all operating conditions. However, to attain durability of the interfacing materials of the piston and cylinder bore wall, materials have been restricted to those which generate undesirable friction, such as iron or steel coated with nickel or chromium for the piston rings, iron or aluminum for the bore walls which sometimes is coated with wear resistant coatings, and iron or aluminum for the piston skirt which sometimes is coated with wear resistance coatings. Attaining zero clearance is even more difficult; the material selection will cause the clearance for pistons in typical cast iron cylinders at top dead center, to vary. For example, aluminum pistons will cause the clearance to vary between 15 microns and 60 microns. The clearance can nearly double under warm operating conditions. Moreover, the bore wall may be scuffed under severe cold start conditions because liquid lubricant may not be present in the ring grooves.

Blow-by allows fluids or combustion gases to leak past piston rings to eventually foul the lubricant on the other side of the rings and create ash within the lubricant itself. Such leakage can be by migration past the backside, front-side or through the split ends of the rings. Gas leakage is usually accompanied by poor oil film scrapping allowing oil to migrate upward into the combustion chamber resulting in contamination by deposits on the combustion chamber walls. Blow-by, particularly front-side leakage, reduces engine compression and robs the engine of its designed power. Conventional ring design is set to create the smallest ring gap at high pressure/high load conditions since the high pressure behind the compression ring will force better sealing contact. But at low load, low speed conditions, gas pressure will not be there and thus the ring gap can get very sloppy. Gas pressure, which acts downwardly on the compression rings, may also freeze the ring against the bottom of the groove or against another ring, induced by high friction; this reduces the ability to maintain proper ring gap with the bore wall. The end gap between the ends of a split piston ring can also increase at high speed allowing an even greater combustion gas leakage.

Premature fatigue failure of a ring is caused by high gas pressure freezing the compression rings to their grooves while the piston slaps against the bore wall jarring and stressing the frozen ring counter to its tension while it is dragged against a non-conforming cylinder wall. Since reciprocating forces change magnitude and direction every 720° F., such stressing constitutes impact loading of the ring; impact loading leads to groove wear, ring instability (commonly referred to as flutter), and eventually ring failure by fatigue.

Induced oil consumption results from a type of peristolic pumping action of oil trapped between the oil ring and the second compression ring (the space adjacent the land between these two rings). On the upward stroke of the piston, such trapped oil is forced back up past the compression rings or behind the compression rings into the combustion chamber. Oil induced into the combustion chamber leaves a residue or carbon deposit. Induced oil consumption can be significant because oil in the land space is effectively pumped upward during the intake stroke at low speed low load engine conditions. The prior art has experimented with several two-ring designs and three-ring designs to eliminate this problem. However, all of the designs proposed to date have either increased oil consumption while reducing friction or reduced oil consumption by increasing friction with higher ring tension.

Narrow rings (having low height) limit the interfacing contact with the bore wall. But unfortunately, thin or narrow grooves to receive such rings are much more expensive and difficult to machine on a high volume basis. Large grooves with single rings have moved unworthy and inoperable.

The chronological history of piston ring design for automotive applications shows repeated effort to prevent blow-by (loss of compression) noting that the rings did not seal effectively against the bore wall or noting that leakage occurred through the grooves supporting the rings. A variety of wear resistant coatings have been applied to the ring grooves as well as to the exposed circumferential sealing surface of the rings (see nickel coating in U.S. Pat. No. 2,575,214; chromium coating in U.S. Pat. No. 3,095,204; and combination coating of Ni, Co-Mo or Mo in U.S. Pat. No. 3,938,814). Flutter of the rings under reverse loading permitted gas and fluid leakage in spite of such coatings and was hoped to have been overcome by increasing the sealing contact pressure of the split rings in each of the spaced grooves. Unfortunately, such increased contact pressure increases friction which then leads to eventual groove or ring wear in spite of oil lubrication.

Applicants are unaware of any design efforts that successfully increase the sealing pressure of the piston rings without increasing piston friction.

SUMMARY OF THE INVENTION

It is an object of this invention to overcome the problems recited above and to provide an economical solution to them.

The invention is a piston and ring assembly operative within a cylindrical bore wall to retain fluid to one side of the assembly. The assembly comprises (a) a piston having at least one annular stepped groove in the side wall of the piston, the groove being stepped into uppermost and lowermost spaces with the uppermost space having the greatest depth; (b) at least two split compression rings in the one groove, effective to each substantially annularly engage the bore wall, the rings having mating surfaces superimposed one upon another and having their split ends out of superimposed alignment, each ring residing essentially in a different one of the spaces with the uppermost ring engageable with both the groove step and the next lowermost of the rings and (c) a solid lubricant that coats essentially all of the groove and constitutes the non-mating surfaces of the superimposed rings, whereby pressure of said retained fluid forces the rings together to act in unison and seal jointly against both the step and a side of the groove opposite the retained fluid. Such assembly substantially reduces blow-by of pressurized fluids, reduces the crevice volume, eliminates pumping of oil into the chamber above the piston while reducing flutter of the compression rings, and substantially reduces premature ring failure. The solid film lubricant assists in eliminating freezing of the rings against the groove sides, increasing ring fatigue life, enhancing ring tension and reducing engine emissions.

BRIEF DESCRIPTION OF THE DRAWINGS

FIG. 1 is an elevational view, partially broken away, of a conventional prior art piston construction;

FIG. 3 is an elevational view, partially broken away, of a piston assembly incorporating the principles of this invention;

FIGS. 4 and 5 are each a perspective view of a pair of mating superimposed piston rings useful with and forming part of this invention, each view depicting a different dovetail construction for the split ends of the rings;

DETAILED DESCRIPTION IN BEST MODE

Figure 2:
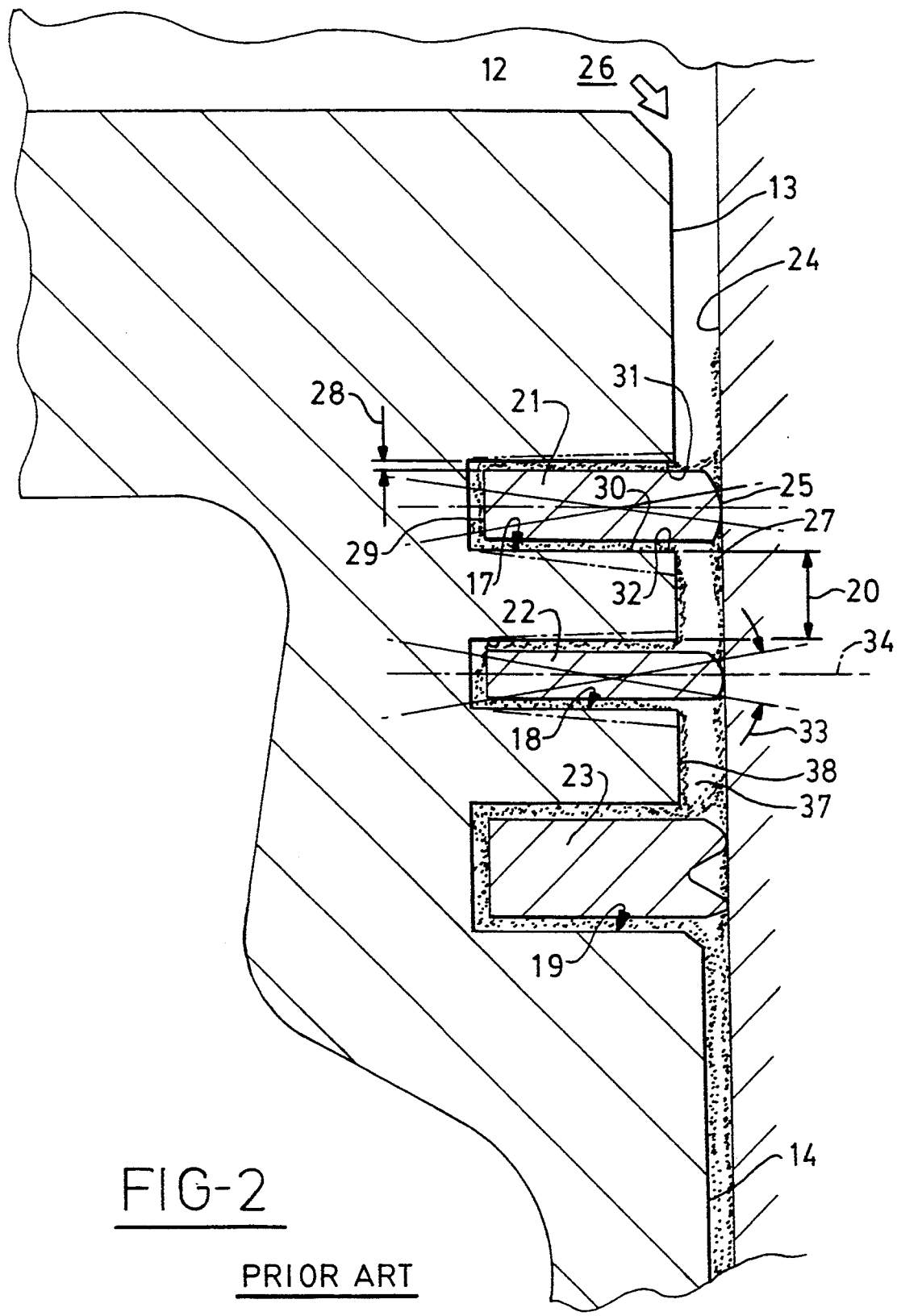
FIG. 2 is a highly enlarged sectional view of a portion of the prior art piston ring assembly of FIG. 1, showing how blow-by occurs and how oil contamination of combustion gases occurs.

Some explanation of how prior art piston assemblies function is necessary to understand the advance of this invention. A typical prior art piston ring assembly 10 is shown in FIGS. 1 and 2, consisting of a piston 11 having a crown 12, side wall 13, skirts 14 depending from the side wall and an interior connecting structure 15 for connecting the piston to a connecting rod pin 16. The side wall has three annular grooves 17,18,19 each aligned with the plane of the piston crown, and each spaced apart an axial distance from the other a distance 20 of about 2 to 10 mm. The top groove 17 contains a first split compression ring 21, the second groove contains a second split compression ring 22, and the bottom groove contains an oil control scrapper ring 23. The rings are usually made from cast iron or steel and are of nearly the same thermal expansion characteristic as that of the bore wall 24 resulting from casting the block or by use of a liner.

Pumping is a result of the following. The top compression ring 21 provides sealing between the combustion chamber 35 and the crank case 36. The second ring 22 functions primarily as an oil scrapper during the down stroke as well as functioning as a gas seal. The oil control ring 23 scrapes oil off the bore during the down stroke as well as maintain a film in the space between the top and second compression rings during the up stroke. The oil control ring 23 is of very high tension to provide adequate sealing against gas pressure and provide effective oil scrapping. More than 50% of the piston ring friction against the bore wall is attributed to the oil control ring and is even greater when bore distortion is present requiring very high ring tension to achieve adequate sealing.

Each of the compression rings are designed to provide for a ring gap, such as at 25, with the cylinder bore wall 24 which is adequate to avoid interference under the most severe operating condition (usually the high speed/high load operation of the engine). Such ring gap 25 will, however, allow a significant blow-by of combustion gases 26 at low speed/low load conditions of the internal combustion engine. This increased gap at low speed/low load conditions results from the ring sticking to the groove sides during some strokes and pulling away from the groove side in other strokes. The gases that blow-by contain combustion products as well as unburned charge which leads to deterioration of the oil lubricant (which is so necessary for maintaining a lubricating film 27 on the cylinder bore and other parts of the engine). Since a major portion of the vehicle operating cycle involves low speed/low load conditions, contamination and fouling of the oil lubricant makes it necessary to change oil and oil filters at regular intervals which optimally should be eliminated.

Each of the compression rings are affected by the combustion gas 26 acting on the top of such rings which presses them against the bottom of the respective groove with a force proportional to the gas pressure. The gases have access to the top of the rings by virtue of a clearance 28 in each groove which typically is about 100 mm. Such gas pressure also acts on the radial inner surface 29 of each ring to assist the tension force of the metallic ring. The combustion gas force is at its maximum near the top dead center (TDC) after ignition. This high axially directed force which continues to press the rings down on the bottom side of the grooves (such as bottom side 30 of groove 17) when the piston side load changes from the minor thrust side to the major thrust side. But the piston 11 imparts a side load acting against the bottom surface of the rings (such as surface 21-1 of ring 21), as the piston moves from the minor thrust side to the major thrust side, to jar the rings against the bore wall. Previously it has been erroneously assumed by the prior art that such side load did not contribute to ring contact force with the bore wall. It is now known that the contribution of the piston side load is equal to the product of the side load and the friction coefficient of the contacting surfaces. If the ring sticks to the groove side (such as groove side 17) due to high friction, the ring contact force will be high. Any relative motion between the ring and groove is very slow and oscillating under such loading; it can be accurately assumed that the friction between the ring and groove side walls falls in the mixed lubrication zone corresponding to a friction range of about 0.12–0.15. This is a high friction coefficient; the friction force is cyclic and can induce fatigue failure of the metallic piston ring.

Cyclic impact loading can cause ring flutter. The ring inertia force resulting from piston motion, gas load and friction force between the ring and the bore wall change both direction and magnitude cyclicly every 720° F.; thus, the groove edges, such as at 31 and 32, are subjected to cyclic impact loading. Under certain conditions ring flutter can and will occur (see tilt angles 33 of the ring plane 34). The flutter can cause groove wear at such edges increasing the clearance between the ring and the groove. Often the groove can wear progressively at both the groove root and groove edges. Excessive groove wear causes not only flutter but also ring instability. Damage resulting from the groove wear becomes progressively worse and, when oil is trapped in such enlarged clearances without venting, may lead to excessive oil consumption by virtue of a peristolic pumping action during piston reciprocation.

Oil migrates past ring 23 into the space 37 between the piston side wall 13 and the bore wall 24, and disposed axially between the oil scrapping ring 23 and the second compression ring 22. Such oil, during cyclic upward strokes, can be pushed behind the compression rings 22 and 23 and sequentially pumped into the combustion chamber 35. Oil consumption can increase significantly as oil is collected in the space 37 during the intake stroke at low speed/low load engine operation.

Another major portion of the blow-by occurs through the end gap of the split rings (the space between the split ends of the compression rings). The combustion gases are able to force their way down through the gap between the split ends of the rings creating a path around the sealing rings.

The inventive piston and piston ring assembly of this invention is distinctively different. As shown in FIGS. 3–6 and 9–12 the piston assembly 40 provides for two compression rings 41,42 matingly superimposed one upon another in a single stepped groove 43 with the split ends 44,45 of each of the compression rings out of superimposed axial alignment. A conventional oil control ring 46 may be used in groove 47 spaced a distance 48 from the single groove. The compression rings may be made of conventional iron or steel or lighter metals such as aluminum. The surfaces of the groove 43 as well as the non-mating surfaces 56,57,58,59,60,61 of the pair of compression rings are coated witch a solid film lubricant in a coating thickness usually of about 10 microns or less. The groove is stepped at 49 into upper and lower spaces 50,51 with the upper space 50 having the greater groove depth 52. The step 49 may be formed with mutually perpendicular surfaces. The groove as a whole can have a much greater height than allowed by prior art grooves (the groove height has heretofore been dictated by the need to keep rings thin to control ring tension). The stepped groove of increased height can have an aspect ratio (depth to height) which is less than 10 and preferably less than 5. Each ring 41,42 resides essentially in a different one of the spaces with the uppermost ring 41 having its surface 55 engageable with both the surface 53 of the groove step and the top surface 54 of the lowermost ring 42. The uncoated mating surfaces 54,55 should have a coefficient of friction of 0.12–0.15 or more. A leak path #1 which would follow behind the rings (along surfaces 57 or 58) and underneath either of the rings (along surfaces 54 or 59) is closed off under all operating conditions. A leak path #2 which would follow between the outer circumference of the rings (surfaces 61,60) and the bore wall 62 is closed or becomes essentially zero clearance therebetween. A leak path #3 through the rings between the split ends thereof is reduced to a negligible amount became of the superimposed non-alignment.

The combined features operate to eliminate blow-by (through leak paths #1, #2 and #3) in this manner: the combustion gas pressure 63 presses down on the top surface 56 of the upper compression ring 41 forcing the pair of compression rings 41,42 to contact each other along their mating uncoated surfaces 54,55. The absence of oil between these mating surfaces and the normally high friction coefficient (i.e. 0.12–0.15) of such surfaces will ensure movement of the pair of rings as a unit or couple. During the compression and expansion strokes of the piston 64, the upper compression ring 41 will act as an effective seal. As the gas pressure 63 increases during the upward movement of the piston during the compression stroke, a corresponding pressure increase occurs on the top surface 56 of the upper compression ring 41 as well as against the radially inner surface 57 forcing the upper ring 41 to assist the inherent ring tension to make sufficient contact against the oil film 65 of the bore wall 62. The lower compression ring 42 will move in tandem with the upper compression ring 41 not only because of the friction between their mating surfaces but because the lower surface 59 of the lower compression ring 42 is free to glide with almost little or no friction on the bottom surface 66 of the groove due to the presence of the solid film lubricant coatings therealong. The unitized rings, being free to move laterally and exert tension against the oil film of the bore wall, also do so while sealing against the step 49 (surface 53) and the bottom of the groove (at surface 66). Leak path #1 is thus blocked. Blow-by will not occur between the inner contacting surfaces 61,60 of the compression rings and the bore wall because the rings are free to adjust radially with no sticking or friction. Thus leak path #2 is blocked.

Although the tension force of the lower compression ring is somewhat lower than that of the upper compression ring, the upper compression ring will be assisted by gas pressure to provide sufficient sealing resulting in little or no blow-by. Because of the rapid increase in gas pressure inside the top compression ring 41, it possesses improved sealing. The lower compression ring, is designed to be essentially an oil film scrapper (has barrel shaped outer edge contour) during the downward motion of the piston and contributes little or no friction.

As shown in FIG. 5, the split end pairs 44–45 and 67–68 of the respective compression rings are out of superimposed alignment and may be referred to hereafter as being overlapped. In addition each end pair of split ends is dovetailed or overlapped in a circumferential direction. This feature is important because of the tight union maintained between the upper and lower compression rings resulting from the force of gas pressure; the leakage path for combustion gases (to migrate through any gap or spacing between the split ends) is eliminated due to this dual overlapping condition. In FIG. 5, the dovetailing construction creates overlapping tongues such as 44a and 45a. As shown in FIG. 4, the dovetailing may be in a radial direction whereby each of the split ends 69,70 of the ring are contoured radially to have a notch creating a tongue 69a and 70a; the tongues are overlapped in a radial direction within a ring, but overlapped circumferentially between rings. Because the superimposed rings block any direct path through the rings, leak path #3 is essentially eliminated.

The crevice volume of the piston and ring assembly is reduced. Such volume is affected by (1) the clearance between the compression ring and groove bottom and sides, and (2) the selection of materials that affect (i) length of the space above the rings that resides between the piston land and bore wall, and (ii) the radial gap of the land above the rings with the bore wall. If a high strength alloy (aluminum or iron) is selected for the piston, the land space can be shortened; if the piston and bore wall metals are matched, thermal growth differences can be controlled to reduce land radial gap. In any event, this invention permits the crevice volume to be reduced by up to 25% over the prior art.

By virtue of the ease of glide of the compression rings as a tandem unit within the stepped groove, the lateral movement of the rings is facilitated; flutter and cocking of the rings within their grooves is substantially reduced. Prior art conditions, which previously produced ring fatigue, are now eliminated due to the presence of the solid film lubricant and by incorporating an oil vent 70. The vent is in communication with land 71 between the oil ring and the stepped groove 43 and is in communication with the crankcase oil sump 72; peristolic oil pumping past the compression rings is substantially eliminated. The lower compression ring 42, because it is bonded between the top compression ring and groove bottom, combines with slow but accelerated downward motion of the pistons to provide improved oil film scrapping permitting little or no excess oil to migrate into the combustion chamber; scrapped oil is routed to the sump through the space 72 to the vent 70. The clearance 73 between the upper surface of the ring 41 and the groove surface 74 (when the unitized rings are pressed against the bottom of the groove by pressure forces) is no greater than about 60 mm. Such clearance 73 cooperates with the friction-free glide of the rings to eliminate cocking or flutter.

Substantial elimination of upward migration of oil into the combustion chamber (by peristolic pumping) is important because it eliminates carbon deposits on the chamber walls from oil. Such deposits force engine designers to keep the engine compression ratio lower to avoid preignition or knock caused by hot deposits. With this invention (which provides essentially zero clearance to the thin oil film on the bore wall and the substantial elimination of peristolic-ring-pumping of oil into the combustion chamber by reduction of the crevice volume and ring flutter) compression ratio (such as 10.5 instead of 9.8) for a given sized piston can be increased; this provides improved engine power which can be increased as much as 5%.

The material of the solid film lubricant coating does not rely on graphite or any one lubricant by itself, but rather upon a specific combination of solid lubricants that perform well at high temperatures (at least up to 600° F.) and attract oil. The lubricants are carried in a polymer or carrier that assists in replenishing the lubricant with water at high temperatures. The solid film lubricants of the coating comprise a mixture of at least two elements selected from the group consisting of graphite, $MoS_2$ and BN; the mixture is carried in a polymer emulsion for deposition, the polymer (polyamide or epoxy thermoset type) adhering the film coating to its anodized support and providing hydrocarbon attraction (oil attraction). Graphite, once selected, should be present in an amount of 29–58% weight of the mixture. Graphite is effective as a solid lubricant usually up to temperatures around 400° F. Molybdenum disulfide, when selected, should be present in an amount of 29–58% by weight of the mixture and most importantly is effective to increase the load bearing capability of the mixture up to a temperature of at least 580° F. but will break down at temperatures in excess of 580° F. in an air or nonreducing atmosphere. Molybdenum disulfide reduces friction in the absence of oil or in the presence of oil and, most importantly, supports loads of at least 10 psi at such temperatures. Molybdenum disulfide is also an oil attractor and is very useful in this invention. Boron-nitride, when selected, should be present in an amount of 7–16% by weight of the mixture and increase the stability of the mixture up to temperatures as high as 700° F. and concurrently stabilizes the temperature for the ingredients of Molybdenum disulfide and graphite. Boron-nitride is an effective oil attractor.

Particle size control of the individual ingredients for the solid film lubricant mixture is important to avoid subsequent machining. The particles should be ultra fine, no greater than 4.0 microns. Graphite, preferably can be introduced into the mixture in the range of 0.5–4.0 microns, Molybdenum disulfide in the range of 0.3–4.5 microns, and Boron-nitride at about 5 microns. The mixture is typically ball milled to produce an average particle size of 0.3–4.0 microns. Boron-nitride is capable of supporting loads of 5 psi but as part of the mixture with graphite and boron-nitride in the aforementioned polymer, loads as high as 500 psi at temperatures up to 400° F. can be supported.

The optimum mixture contains all three ingredients, which will provide for a temperature stability up to temperatures as high as 700° F., load bearing capacities well above 10 psi and excellent oil attraction capability. The combination of all three elements will provide a coefficient of friction which is in the range of 0.07–0.08 at room temperature and a coefficient of friction as low as 0.03 at 700° F.

The thermoset polymer is preferably comprised of epoxy or polyamide described below, present in an amount of 30% to 60% of the mixture. The polymer cross-links at temperatures of 375° F. to form a rigid cement-like structure that provides hydrocarbon and water vapor transfer to graphite while attracting oil and adheres very well to an aluminum metal support that has been precoated with a phosphate ester type epoxy such as zinc phosphate. The polymer also should contain a curing agent present in an amount of 2–5% of the polymer such as dicyanidimide; the polymer may also contain a dispersing agent present in an amount of 0.3–1.5% such as 2,4,6tri dimethylamino ethyl phenol. The carrier for such polymer may be mineral spirits or butyl acetate.

Figure 6:
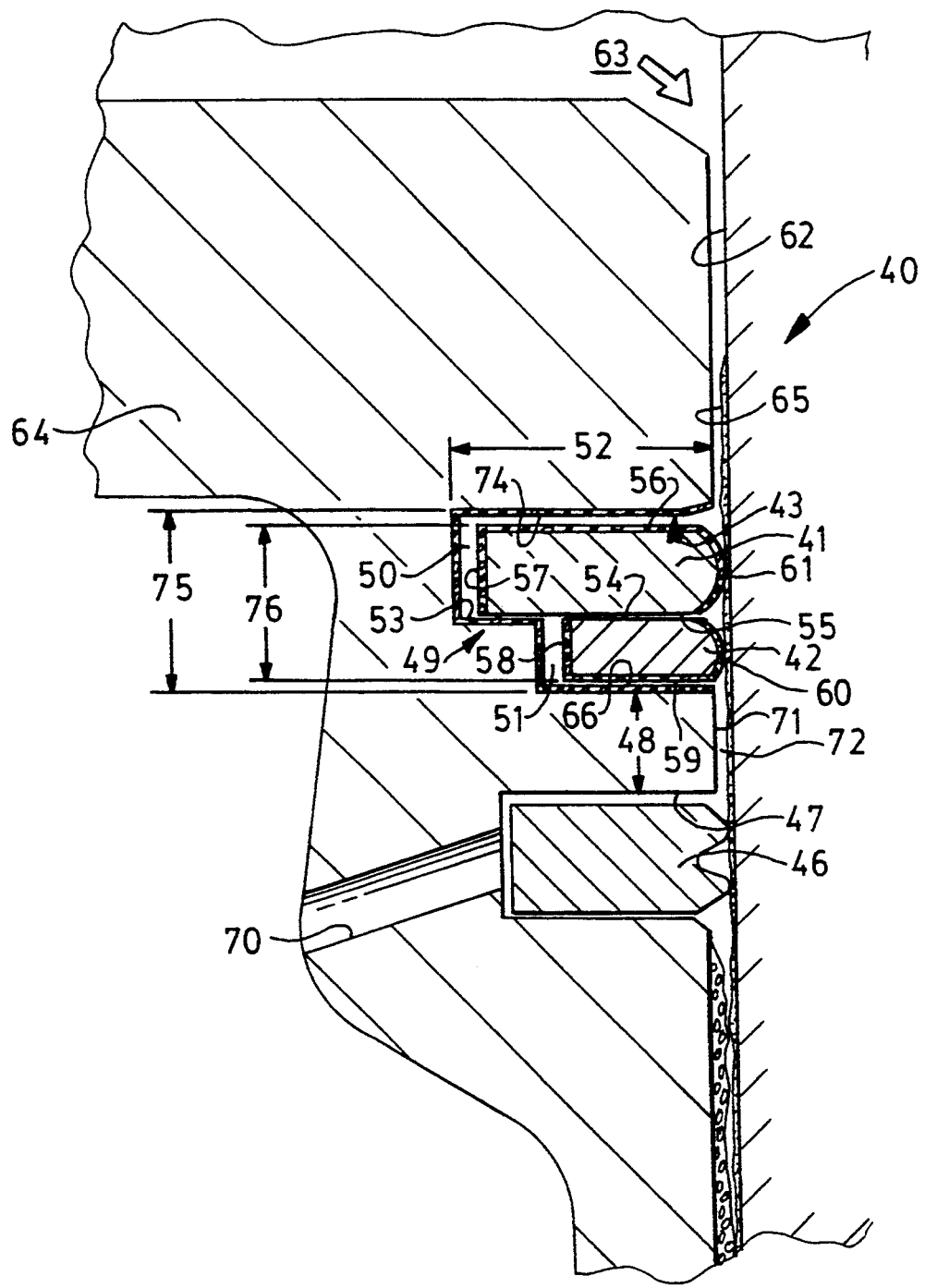
FIG. 6 is a view similar to FIG. 5, but embodying the principles of this invention.

The stepped configuration of the compression ring groove is of importance. It eliminates cocking of the rings within the groove because of the double fulcrum resulting from the step and the lower ring, if cocking were to be triggered. However, because of the continuous contact of the coordinated rings with the bottom of the groove under most conditions, as forced by the pressure of chamber gases, the dual of rings are consistently urged downward. The ability of the rings to cock or flutter within such a stepped groove is significantly reduced. The stepping may be constructed as shown in FIG. 6, whereby the step provides for a larger radial width for the upper compression ring and a narrow width for the lower compression ring.

In another aspect, the invention is a method of making a piston and ring assembly comprising: (i) providing a metallic piston with a crown and an annular depending side wall; (ii) forming a stepped annular groove (i.e. by first rough mechanical machining followed by electron discharge machining) in the side wall having a total height of at least 2 mm; (iii) fabricating a pair of metallic split annular compression rings nestable within the stepped groove and effective to operate together as a superimposed unit with each facing different sides of the step; (iv) coating the stepped groove as well as non-mating surfaces of the compression rings, the coating comprising a porous solid film lubricant stable at temperatures of at least 600° F. ; and (v) inserting the pairs of coated rings into the coated groove with their split ends out of superimposed alignment.

Figure 8:
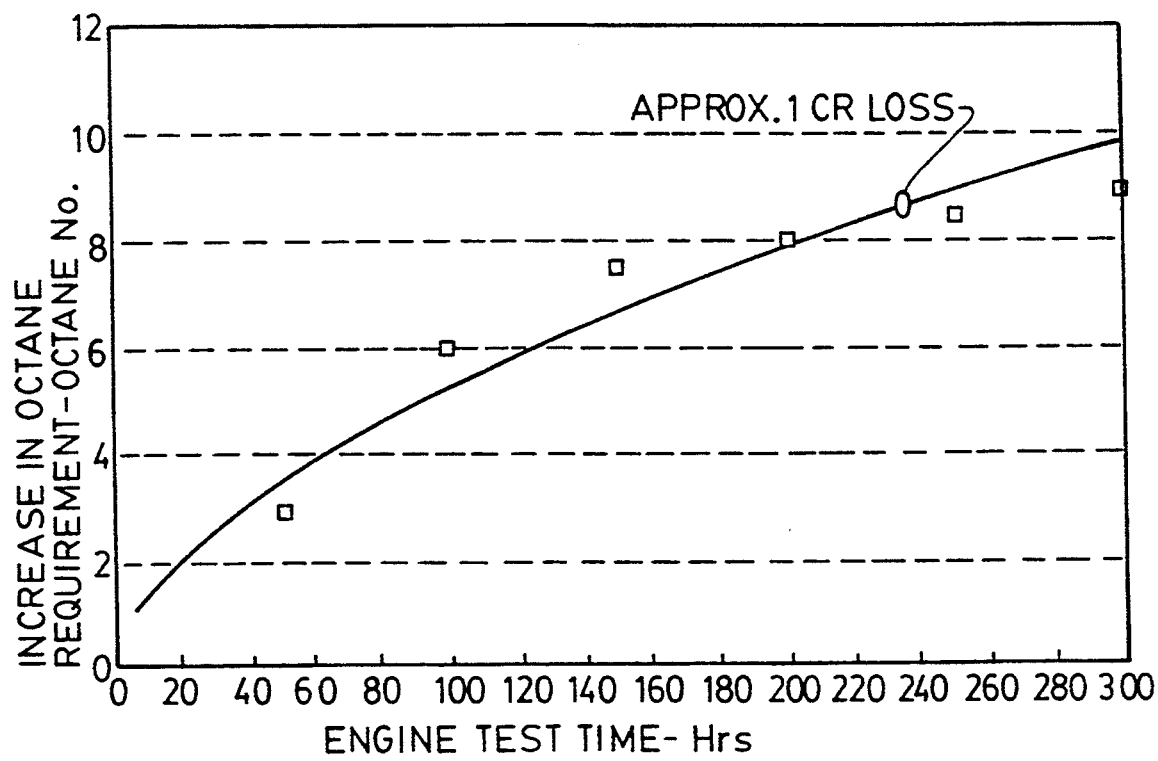
FIG. 8 is a graphical illustration of octane increase as a function of test time for an engine with varied chamber deposits.
Figure 9:
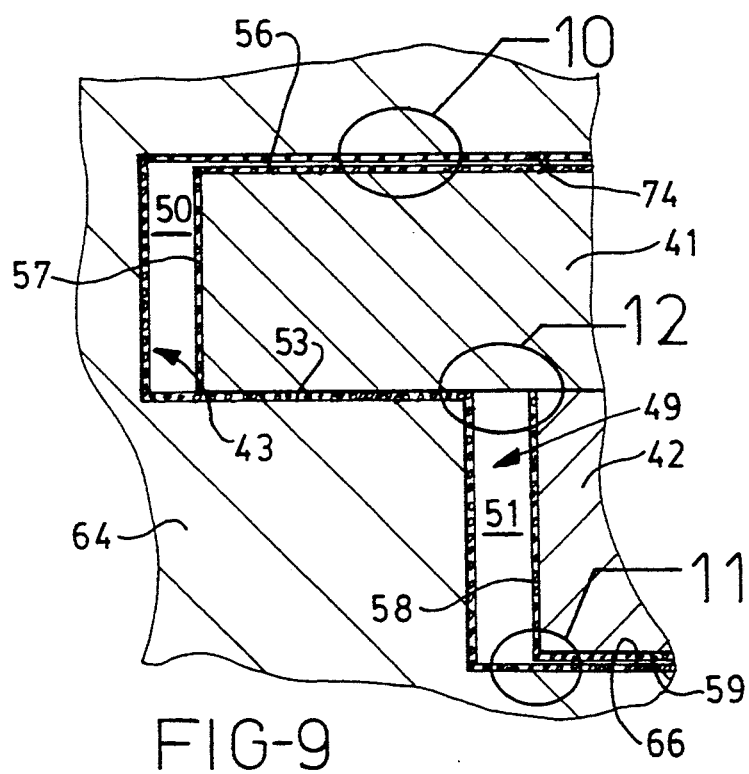
FIG. 9 is a still further greatly enlarged view of a portion of the groove and ring unit of FIG. 6.
Figure 10:
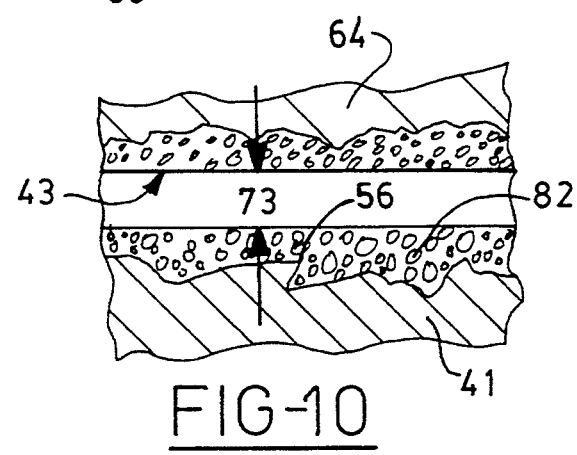
FIGS. 10, 11 and 12 are still further enlarged views of designated portions of FIG. 9.
Figure 11:
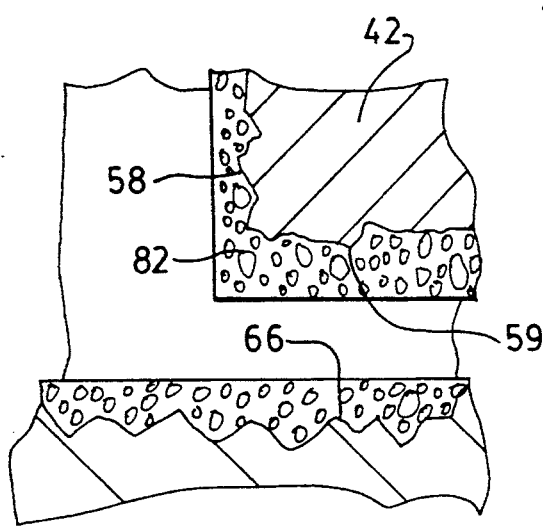
Figure 12:
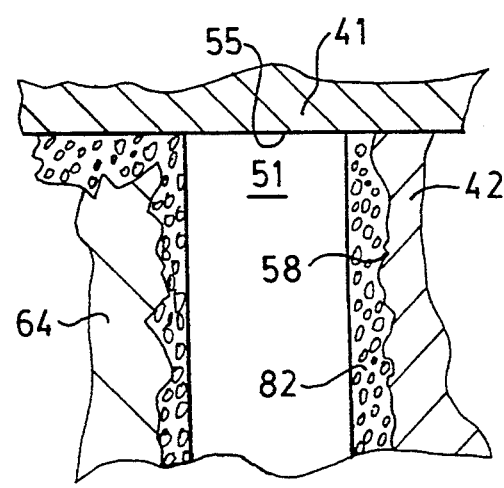

The rings 41 and 42 can be constituted of steel, hollow cast iron, or aluminum. The rings are fabricated to have a total combined height 75 that is equal to the groove height 76 less 60 mm or less. The ease of electron discharge machining of the groove can be further facilitate by constituting the piston 64 of an aluminum based material, such as 6061 Al. The aluminum alloy increases thermal conductivity to transfer combustion heat to the rings to facilitate a more effective heat disposal to the oil lubrication through the rings; to complete such heat transfer path, the piston rings are also fabricated of an aluminum based material such as Al 220 alloy. Aluminum compression rings have been avoided in the past because of the fear of surpassing the fatigue limit of aluminum rings, assumed to be about 500 hours. This invention has discovered that it is the high friction and cyclic sticking characteristic of conventional ring design, and not the material, that has impaired fatigue life. By use of the piston assembly design herein, fatigue life of an aluminum ring can be increased to 5,000 hours (equivalent to typically 150,000 vehicle miles for an engine). Moreover, the aluminum rings can now be made much thicker than iron based rings because their inherent material tension does not need to be circumscribed. The rings are formed first by conventional forming process such as blanking or roll-forming and then finished machined by electron discharge machining to process a submicron dimpled surface that aggressively receives the coating. The barrel edge shapes of the rings can be more accurately defined. With the inventive ring design and assembly herein, the method of making can now comprehend aluminum based rings and pistons without detrimentally affecting sealing. The absence of carbon deposits in the combustion chamber can now lead to a significant reduction in full octane requirement to obtain equivalent engine performance (see FIG. 8).

The method of making is economical because (i) the machining of the metal piston body, particularly the side wall of the piston, can be carried out with much greater speed and accuracy since the height of the groove is now much wider than that permitted by state-of-the art compression ring grooves, and (ii) coating of the groove and rings can be carried out by electrostatic spraying or dipping to provide a unique porous composition. It is preferable to electro-statically spray the solid film lubricant mixture into the interior surfaces of the groove after the surfaces have been pretreated with zinc phosphate to enhance adhesion. The coating emulsion will have a different polarity than the groove metal. Electrostatic spraying involves charging the coating material and with one polarity and charging the surface to be coated with an opposite polarity. Emulsion application can use a mineral spirit carrier for the lubricant particles, or use water.

Figure 7:
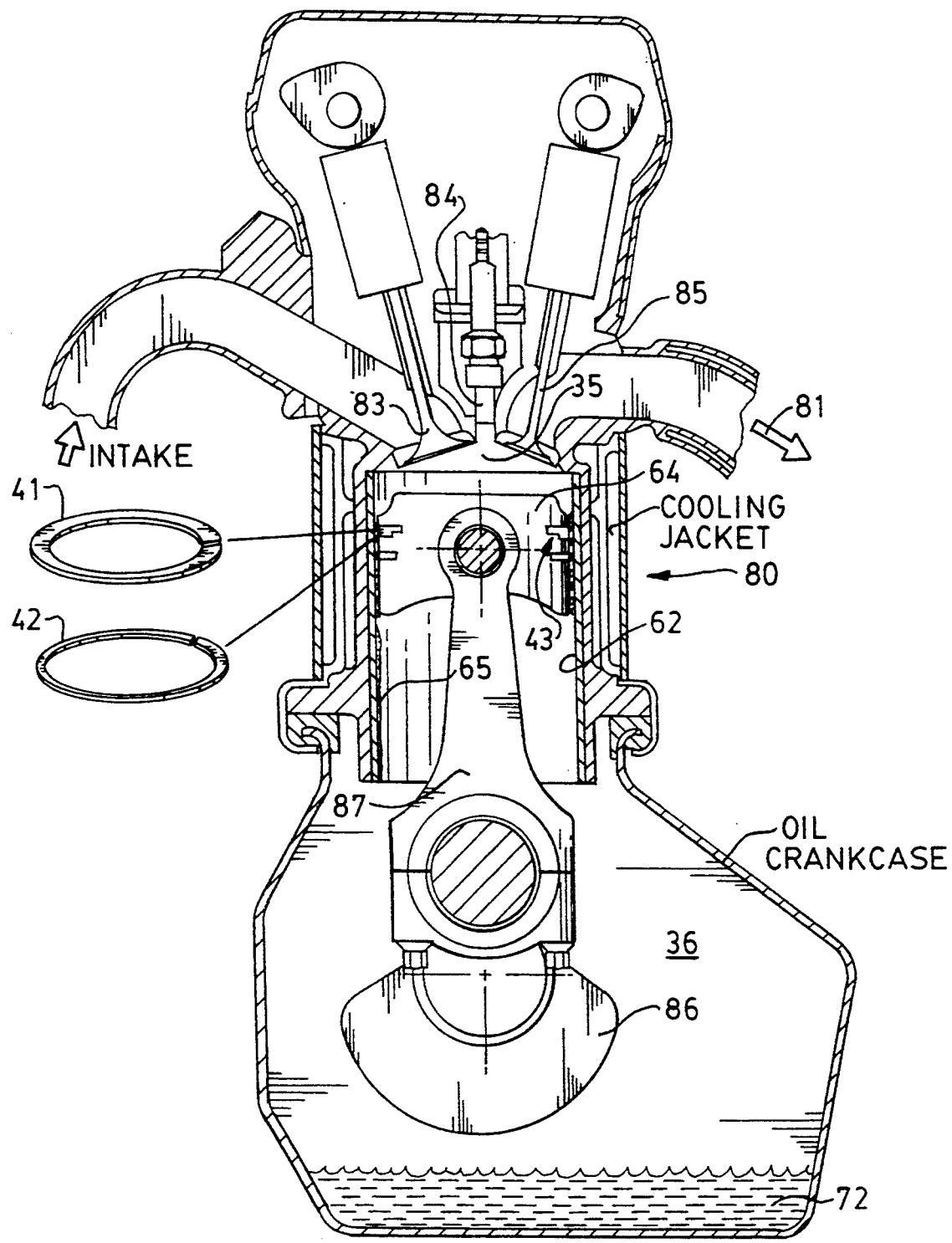
FIG. 7 is a central sectional elevational view of an engine incorporating the piston assembly of this invention.

The invention also comprehends a method of reducing piston ring blow-by (a new use application) in an oil bathed cylinder bore wall 65 of an internal combustion engine 80. The method reduces noxious emissions 81 from the engine, reduces contamination of the engine oil 72 for a lubrication system, and permits the engine 80 to be operated at higher compression ratios with improved efficiency. The method (with reference to FIG. 7) comprises the steps of: (i) providing a piston 64 with a stepped annular groove 43 coated with solid film lubricant stable at high temperatures (such as at least 600° F.); (ii) inserting a pair of matingly superimposed split compression rings 41,42 into such stepped groove with the split ends of the rings out of superimposed alignment, substantially all of the non-mating surfaces of the rings being coated with a solid film lubricant 82 stable at high temperatures, and (iii) reciprocatingly operating the piston assembly in the bore wall 62 for carrying out engine operation. Four stroke operation would comprise induction or injection of a combustible mixture into the combustion chamber 35 as permitted by intake valve 83, compression, ignition by a sparking device 84, and exhausting through exhaust valve 85 as emissions 81 (the piston 64 reciprocating to drive a crankshaft 86 through a connecting rod 87 and the bore wall and piston being splashed with oil to retain the oil film 65), whereby the rings 41,42 act in unison due to the mating friction therebetween and are free to radially adjust as a unit with little or no inhibiting friction while maintaining sealing engagement with the step 49 of the groove, the bottom side 66 of the groove, the bottom side 66 of the groove and the oil film 65 on the bore wall.

Because blow-by and oil pumping is substantially eliminated, emissions 81 are reduced in noxious content by as much as 20%; oil migration is prevented from contributing to hydrocarbons in the combustion chamber and the oil supply 72 is not consumed and is retained as essentially ash free and uncontaminated because combustion gases cannot migrate to the oil reservoir. Uncontaminated oil is vented through a passage communicating with the oil sump. The significant reduction in ring friction and improved tension contact with the oil film of the bore wall leads to an improvement in fuel economy (up to 3%), reduced ring wear by up to 75%, and lower engine noise due to zero clearance.

We claim:

1. A piston and ring assembly operative within a cylindrical bore wall to retain fluids to one side of said assembly, the piston having a crown with a depending annular side wall for reciprocal movement along the bore wall, comprising:
(a) a piston having at least one annular stepped groove in the side wall, said groove being stepped into upper and lower spaces with the upper space having the greater groove depth;
(b) at least two compression rings in said groove effective to each substantially annularly engage said bore wall, said rings having mating surfaces superimposed one upon another and having split ends out of superimposed alignment, each ring residing essentially in a different one of said spaces with the uppermost of said rings engageable with both said groove step and the next lowermost of said rings; and
(c) a solid lubricant coating essentially all of said groove and constituting substantially the non-mating surfaces of said superimposed rings.

2. The assembly as in claim 1 in which said bore wall communicates with a combustion chamber of an internal combustion engine and said bore wall is oil lubricated.

3. The assembly as in claim 1, in which (i) the uppermost of said compression rings is exposed to high temperature internal combustion engine gases, (ii) said bore wall is oil lubricated to provide an oil film there along, whereby the lowermost of said compression rings serves to scrape oil along said bore wall to ensure sufficiency of said film, and (iii) said solid film lubricant is oil absorbent.

4. The assembly as in claim 3, in which said ring and piston are constructed of metal and said solid film lubricant is comprised of a mixture of at least two of graphite, boron-nitride, and molydisulfide.

5. The assembly as in claim 4 in which said mixture is selected to have a temperature stability of at least 600° F. .

6. The assembly as in claim 1, in which said groove step is comprised of right angle surfaces, and the height of the step is in the range of 2 to 6 mm.

7. The assembly as in claim 1, in which the aspect ratio of said stepped groove is less than 10 and the height of said groove is at least 2 mm.

8. The assembly as in claim 1, in which said superimposed rings substantially fill the volume of said groove except for (i) a radially inner space and (ii) a gap tolerance between the ring pair and the side surfaces of said groove, said gap being less than 60 mm.

9. The assembly as in claim 1, in which said compression rings have dovetailed split ends.

10. The assembly as in claim 9, in which the dovetail construction of said split ends is in a circumferential direction.

11. The assembly as in claim 1, in which said piston additionally comprises a skirt coated with a solid film lubricant to reduce skirt friction and reduce lateral movements of the piston.

12. A piston and ring assembly operative within a cylinder bore wall of an internal combustion engine, the piston having a crown with an annular side wall for reciprocal movement along the bore wall, and said bore wall being bathed in oil comprising:
(a) at least one annular stepped groove in said side wall having a height of at least 4 mm;
(b) at least two compression rings in said groove effective to exert a resilient circumferential sealing force against said bore wall, said rings being superimposed one upon another to act in unison with their split ends out of superimposed alignment, the lower of said rings having a thickness generally commensurate with the height of the step, said rings being constituted of an aluminum based material having a combined height that is 60 mm or less the same as said groove height;
(c) a solid film lubricant layered on the surfaces of said groove and layered substantially on the non-mating surfaces of said superimposed rings; and
(d) means to vent oil through said piston that has been scraped by said rings.

* * * * *